United States Patent [19]

Onoda et al.

[11] 4,184,744
[45] Jan. 22, 1980

[54] OPTICAL FIBER

[75] Inventors: Seiichi Onoda, Tokorozawa; Toshiki P. Tanaka, Tokyo; Masao Sumi, Higashi-yamato, all of Japan

[73] Assignees: Hitachi, Ltd.; Hitachi Cable, Ltd., both of Japan

[21] Appl. No.: 737,266

[22] Filed: Nov. 1, 1976

[30] Foreign Application Priority Data

Nov. 10, 1975 [JP] Japan .................. 50-134046

[51] Int. Cl.² .................................. G02B 5/14
[52] U.S. Cl. ........................ 350/96.33; 350/96.31
[58] Field of Search .............. 350/96.30, 96.31, 96.33

[56] References Cited
U.S. PATENT DOCUMENTS

| | | | |
|---|---|---|---|
| 3,778,132 | 12/1973 | Pinnow et al. | 350/96 WG |
| 3,785,718 | 1/1974 | Gloge | 350/96 WG |
| 3,963,468 | 6/1976 | Jaeger et al. | 350/96.6 N X |
| 4,033,667 | 7/1975 | Fleming, Jr. | 350/96.31 |

OTHER PUBLICATIONS

D. Marcuse "Mode Mixing with Reduced Losses in Parobalic Index Fibers" BSTJ Vol. 55, No. 6, Jul.-Aug. 1976, pp. 777-802.

Primary Examiner—Rolf G. Hille
Attorney, Agent, or Firm—Craig and Antonelli

[57] ABSTRACT

In order to make the transmission loss of the lowest order leaky mode over the transmission length 10dB or more, an optical fiber for optical transmission is constructed of a cladding layer whose refractive index is constant, an intermediate layer which has a constant refractive index lower than the refractive index of the cladding layer, and a core whose refractive index is continuously varied so as to be the highest at the central part and to be substantially equal to that of the cladding layer at the peripheral part, and the thickness of the intermediate layer is 0.1-1 times the radius of the core.

4 Claims, 9 Drawing Figures

RATIO : THICKNESS OF INTERMEDIATE LAYER TO RADIUS OF CORE

OPTICAL FIBER

BACKGROUND OF THE INVENTION

1. Field of the Invention.

The invention relates to an optical fiber, and more particularly to improvements in an optical fiber which is used in an optical communication system and transmits only specified transmission modes and which is constructed of three layers consisting of a core, an intermediate layer, and a cladding layer.

2. Description of the Prior Art

Owing to the advancements of transmission theory and manufacturing techniques for optical fibers, is has become possible to obtain an optical fiber whose transmission loss is several decibels per km in the transmission of optical waves in the wavelength region of visible and near infrared wavelengths.

When such an optical-fiber is used as a transmission line, the repeater spacing can be made much longer than in a conventional coaxial system. An extension of the repeater spacing, however, brings about the problem of the transmission bandwidth of the fiber. In ordinary multi-mode fibers, having a large number of propagation modes, the transmission bandwidth is limited solely by a wave distortion based on the difference of the group velocities of the respective modes, and it becomes narrower as the transmission length becomes greater.

Accordingly, for transmitting optical signals which have a certain bandwidth, the transmission bandwidth of the optical fiber must be expanded with an increase in the transmission length.

As an effective expedient for solving such a problem, the so-called graded-core fiber has hitherto been known. That is, the refractive index in the radial direction of the fiber is decreased continuously from the center towards the outer periphery. Theoretically, the graded-core optical fiber can make the group delays of the propagation modes substantially equal. In actuality, however, the radius of the optical fiber is definite and a parabolic continuous refractive index distribution is cut at the periphery of the fiber. Therefore, higher order propagation modes close to the cut off condition become smaller in the group delay than do the other modes. This becomes a factor for bandwidth limitation. In order to obtain a wide bandwidth of the graded-core optical fiber, accordingly, the propagation modes close to the cut off condition must be removed. As an optical fiber fulfilling this requirement, there has been known on e which is composed of a core disposed at the center and having a parabolic refractive index distribution and a cladding layer disposed around the core and having a refractive index higher than the lowest refractive index of the core and lower than the highest refractive index at the center of the core, or one which an intermediate layer having a refractive index equal to the lowest refractive index is arranged between the core and the cladding layer (see U.S. Pat. No. 3,785,718 for example).

With the improved graded-core optical fiber, a sufficient loss must be bestowed on the higher order modes, and it is necessary to render negligible the influence on the transmission bandwidth by the higher order modes whose group delays are smaller than those of the other modes. Concretely, the unnecessary modes are made "leaky" by the three-layer structure as discussed previously.

The loss of the leaky modes is determined by the refractive indexes and thicknesses of the layers constituting the optical fiber. In practice, it is desirable to make the refractive index of each layer and the core radius constant and to control only the width of the intermediate layer independently of them.

In general, when the width of the intermediate layer is large, the loss of the leaky modes becomes small, and when it is small, the loss becomes large. In order to optionally set the loss of the leaky modes in this manner, a structure is required in which the width of the intermediate layer can be freely changed. The prior-art optical fiber, however, has the disadvantage that once the refractive index distribution of the core has been determined, the design of the intermediate layer lacks versatility.

SUMMARY OF THE INVENTION

A general object of the invention is to provide an optical fiber which is effective for optical communication.

Another object of the invention is to provide an optical fiber whose effective transmission length is long and simultaneously whose transmission bandwidth is wide.

Still another object of the invention is to provide an optical fiber which can render unnecessary higher order modes leaky and bestow an arbitrary loss thereon.

Further, a concrete object of the invention is to provide an optical fiber which makes the transmission loss of the lowest order leaky mode over the transmission length 10 dB or more.

In order to accomplish these objects, the invention provides an optical fiber of a concentric three-layer structure consisting of a core having a parabolic refractive index distribution, an intermediate layer having a constant refractive index and a cladding layer also having a constant refractive index, characterized in that the refractive index of the core at the boundary part with the intermediate layer is set to be substantially equal to that of the cladding layer and that the width of the intermediate layer in the radial direction is set to a range of 0.1–1 times the radius of the core.

With an optical fiber constructed as described above, the attenuation of unnecessary leaky modes whose mode indices lie between the refractive index of the cladding layer and that of the intermediate layer increases as the thickness of the intermediate layer becomes smaller, and the attenuation of the leaky modes increases as the mode order becomes higher, so that the influence of the leaky modes on the bandwidth characteristic can be neglected by setting the attenuation of the lowest order leaky mode at above a predetermined value corresponding to a transmission length.

Accordingly, the attenuation of the unnecessary leaky modes can be freely controlled by changing the thickness of the intermediate layer.

Another advantage of the optical fiber according to the invention is that the substantial core diameter can be made relatively large.

In general, in an optical fiber, in order to bestow a sufficient attenuation on unnecessary leaky modes and to increase the stability of the transmission characteristic against external stresses ascribable to bending etc., it is necessary to make the difference between t ɔ refractive indices of a core and an intermediate l ʀʏer and to make the width of the intermediate layer small. It is not a desirable method in manufacture to make the difference between the refractive indices of the core and a cladding layer large from the standpoint of widening the transmission band, because the refractive index distribution of the core must be strictly set. With the optical fiber according to the invention, the problem can be solved by controlling the thickness of the intermediate layer.

Furthermore, with the optical fiber according to the invention, it is unnecessary to control the refractive index to be a continuous distribution over a wide range. This is advantageous in the manufacture of the optical fiber.

In general, in order to control the refractive index distribution, there may be employed a method in which a glass material of, for example, $SiO_2$ to serve as a host is doped with an oxide such as $GeO_2$, $TiO_2$, $P_2O_5$, $B_2O_3$ and $Al_2O_3$ and in which the quantity of doping is varied in the radial direction. With the prior-art optical fiber, in making the gradient of the refractive index distribution large, the concentration gradient of the dopant must be made large. However, when the concentration gradient of the dopant is large, it is often the case that the diffusion of the dopant arises in thermal processes attendant upon the fabrication of a preform, the drawing of the fiber, etc., and that the control of the refractive index distribution becomes complicated. On the other hand, where the refractive index variation in the core may be small, as in this invention, the concentration gradient of the dopant may be small as well. Therefore, any inconvenience attendant upon the diffusion described above is avoided.

The above-mentioned and other objects and features of this invention will become more apparent from the following description taken in conjunction with the drawings.

DESCRIPTION OF THE PREFERRED EMBODIMENTS

The principle of the invention will be explained with reference to FIG. 1.

Figure 1:
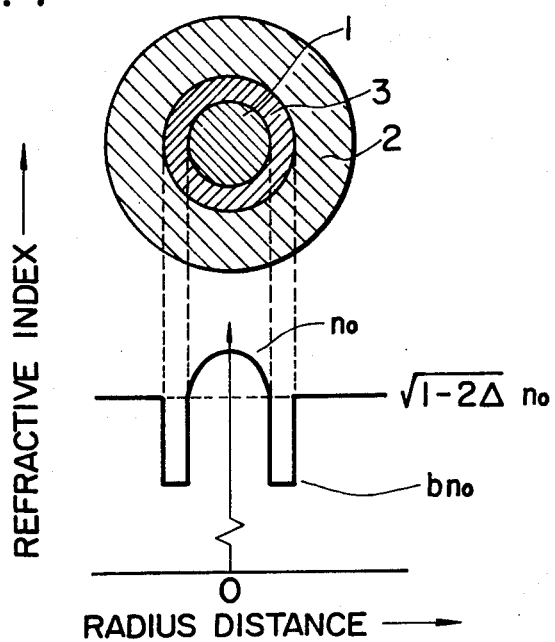
FIG. 1 shows a section of the optical fiber according to the invention and a refractive index distribution in the radial direction thereof.

In the structure of an optical fiber shown in FIG. 1, let $n_o$ denote the refractive index of the center of a core 1, $n_o\sqrt{1-2\Delta}$ (where $2\Delta$ indicates a very small positive value) the refractive index of the periphery of the core, and $b \cdot n_o$ and $n_o\sqrt{1-2\Delta}$ (where $b < \sqrt{1-2\Delta}$) the refractive indices of an intermediate layer 3 and a cladding layer 2. The radius of the core and the thickness of the intermediate layer are denoted by a and $\delta a$, respectively.

It is assumed that the refractive index n(r) at a radius r within the core decreases monotonously with respect to r. As an example, consider the following:

$$n(r) = \{1 - 2\Delta(r/a)v\}^{1/2}n_o; \quad 0 \leq r < a \qquad (1)$$

Figure 2:
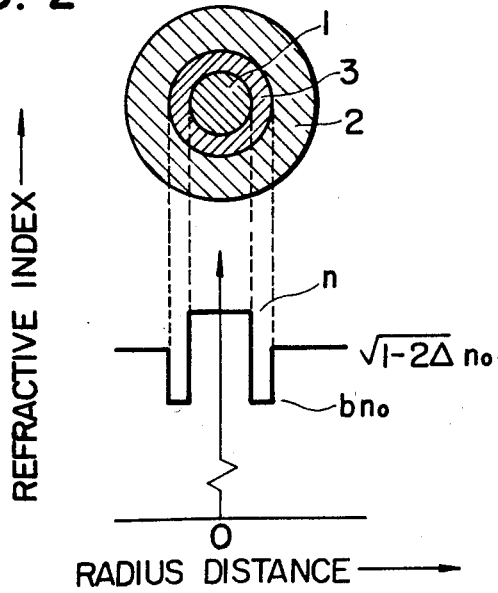
FIG. 2 shows a section of an optical fiber having a step-like refractive index equivalent to the refractive index in the invention and a refractive index distribution thereof, the Figure being given for the analysis of the invention.

There is now obtained an optical fiber in which the mode index becomes an intermediate value between the refractive indices of the intermediate layer and the cladding layer in the optical fiber of FIG. 1, that is, which has a step-like refractive index distribution as in FIG. 2, equivalent with respect to the leaky mode construction. To this end, the normalized frequency V of the core is defined as follows:

$$V = k \int_0^a \{n^2(r) - n^2(\infty)\}^{\frac{1}{2}} dr \qquad (2)$$

k: optical wave number in vacuum,
n($\infty$): refractive index in the cladding.

The physical meaning of the normalized frequency V is the number of modes of the general fibers in which the refractive index of the intermediate layer has become equal to the refractive index of the cladding. In Equation (1), the quantity V becomes:

$$V = \pi k a n_o \sqrt{2\Delta}/4 \quad (\pi: \text{circular constant}) \qquad (3)$$

Now, let n and a denote the refractive index and radius of the core in the fiber shown in FIG. 2, $b \cdot n_o$ and $\delta a$ the refractive index and thickness of the intermediate layer, and $n_o\sqrt{1-2\Delta}$ the refractive index of the cladding. Then, the quantity V becomes:

$$V = ka\sqrt{n^2 - (1-2\Delta)n_o^2} \qquad (4)$$

Here, equating Equations (3) and (4), n becomes:

$$n = \left\{1 - 2(1 - \frac{\pi^2}{16})\right\}^{\frac{1}{2}} n_o \qquad (5)$$

Since the refractive index of the intermediate layer is uniform, the fiber of FIG. 2 is determined by Equation (5) and the fiber of FIG. 1 may be considered equivalent with respect to the leaky modes whose mode indices exist in a range of $b \cdot n_o - n_o\sqrt{1-2\Delta}$.

Regarding the fiber of FIG. 2, the loss characteristic of the leaky modes will be explained.

In general, the leaky modes have a larger loss as the order is higher and are smaller as it is lower. This corresponds to the magnitude of the evanescent fields of the modes. In order to eliminate the influence of the unnecessary leaky modes on the bandwidth, accordingly, the loss value of the lowest order leaky mode may be set at above a predetermined value. Assuming that the number of the leaky modes is large, the average loss of the lowest order leaky mode will be evaluated. Here, for the sake of simplicity, the refractive indices of the core, intermediate layer and cladding are respectively n, q·n and p·n, where:

$$p = \sqrt{\frac{1 - 2\Delta}{1 - 2(1 - \frac{\pi^2}{16})\Delta}} \qquad (6)$$

$$q = b\sqrt{\frac{1 - 2\Delta}{1 - 2(1 - \frac{\pi^2}{16})\Delta}} \qquad (7)$$

The normalized frequency $\hat{v}$ is defined as:

$$\hat{v} \equiv kan\sqrt{1-q^2} \qquad (8)$$

Letting j·u (j: imaginary unit) denote the normalized propagation constant in the radial direction of the core, and U denote an asymptotic value, the following holds approximately:

$$u = U \exp(-1/\hat{v}) \qquad (9)$$

Here, U is a constant depending on the mode. For the $HE_{nm}$ mode, it is given by the n-th zero point of Bessel function $J_{n-1}(x)$.

Lettering $\hat{w}$ and w denote the normalized propagation constants in the intermediate layer and the cladding layer, respectively, the following relations hold among them and u and $\hat{v}$:

$$\left.\begin{array}{l} u^2 + \hat{w}^2 = \hat{v}^2 \\ u^2 + w^2 = \epsilon^2 \hat{v}^2 \end{array}\right\} \qquad (10)$$

$$\epsilon^2 = (1-p^2)/(1-q^2) \qquad (11)$$

Since the cut off condition of the fiber is given by w=0, the U value $U_o$ of the mode which is just cut off is given from Equations (9) and (10), as follows:

$$U_o = \epsilon\hat{v}\exp(1/\hat{v}) \qquad (12)$$

The lowest order leaky mode is a mode whose order is higher by just one than the cut off mode. Therefore, the U-value $U_L$ of the lowest leaky mode is evaluated by adding a mode spacing $\Delta U$ in $U_o$ to Equation (12).

In the fiber of FIG. 2, EH, TE and TM modes can exist besides the HE mode. Since, however, all the former modes degenerate to the HE mode, consider the HE mode. The number N of the HE modes as include the leaky modes is given by:

$$N = \hat{v}^2/8 \qquad (13)$$

Therefore, the mode spacing $\Delta U$ in the mode just cut off becomes:

$$\Delta U = \frac{4(\hat{v}^2 - U_{11}^2)}{\hat{v}^2 U_o} \qquad (14)$$

where $U_{11}$ is a U-value corresponding to $HE_{11}$, mode, and $U_{11} = 2.405$.

After all, from Equations (12) and (14), the U-value $U_L$ of the lowest order leaky mode is given by:

$$U_L = U_o + \Delta U \qquad (15)$$

-continued $$= \epsilon\hat{v}\exp(1/\hat{v}) + \frac{4(\hat{v}^2 - U_{11}^2)}{\epsilon\hat{v}^3 U \exp(1/\hat{v})}$$

When the U-value is obtained, various propagation constants are evaluated by Equations (9), (10) and (11).

It is known that the loss α of the leaky mode is given by:

$$\alpha = \frac{3.47 \times 10^{10}}{\beta a^2} \cdot \frac{u^2 \hat{w}^2 |w|}{(1 - \epsilon^2)\hat{v}^2} \exp(-2\delta w)(dB/km) \qquad (16)$$

where β is evaluated from:

$$\beta^2 = k^2 \cdot n^2 - u^2/a^2, \qquad (17)$$

and a is measured in microns. Therefore, the intermediate layer thickness ratio δ at which the loss of the lowest order leaky mode becomes $\alpha_L$ (dB/km) is expressed by the following equation set:

$$\left.\begin{array}{l} \delta = \frac{B + C}{A} \\ A = 2\hat{v}\sqrt{1 - \eta} \\ B = \ln\frac{\hat{v}\eta(1-\eta)\sqrt{\eta - \epsilon^2}}{1 - \epsilon^2} \\ C = \ln\frac{5.05 \times 10^6}{L} \\ \eta = \frac{U_L^2}{\hat{v}^2}\exp(-\frac{2}{\hat{v}}) \end{array}\right\} \qquad (18)$$

Figure 3A:
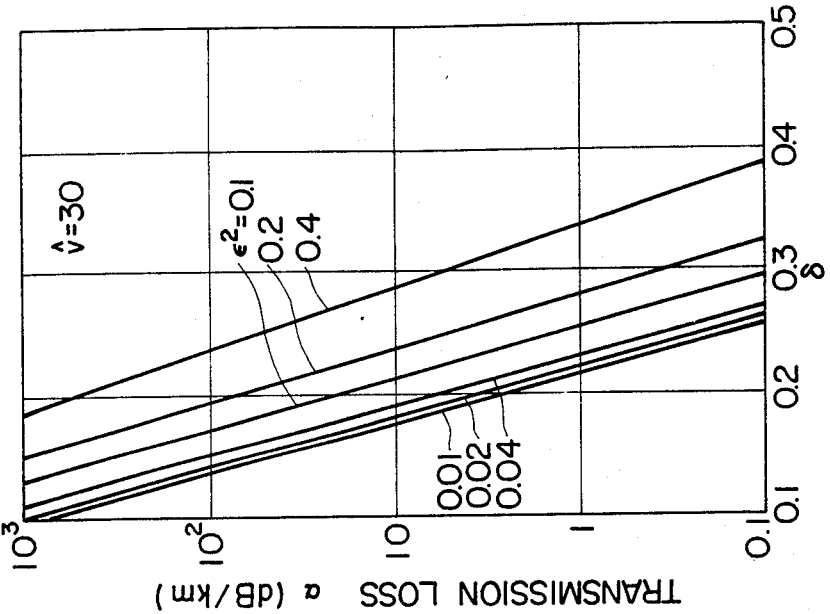
FIGS. 3A, 3B and 3C are characterized diagrams showing the relations between the ratio $\delta$ of the thickness of an intermediate layer and the radius of a core and the transmission loss $\alpha_L$ of the lowest leaky mode.
Figure 3B:
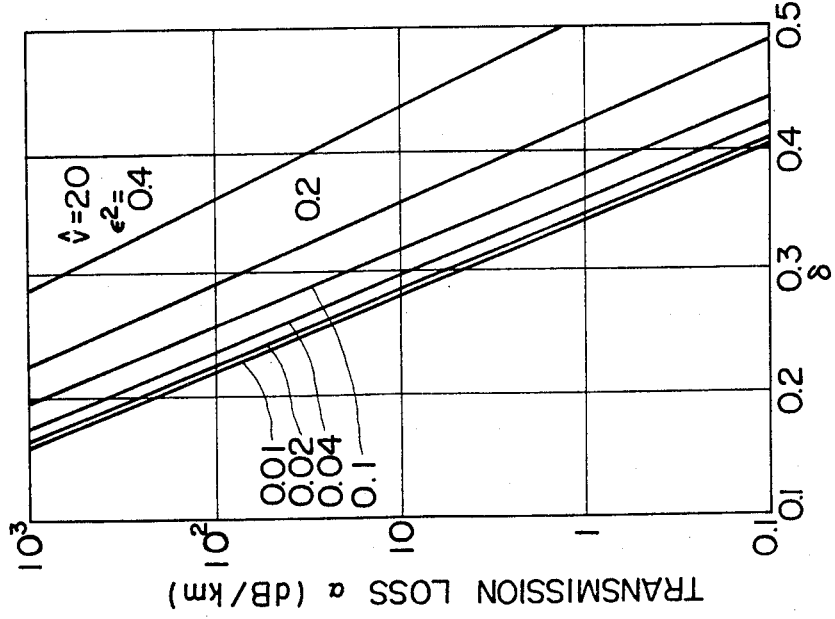
Figure 3C:
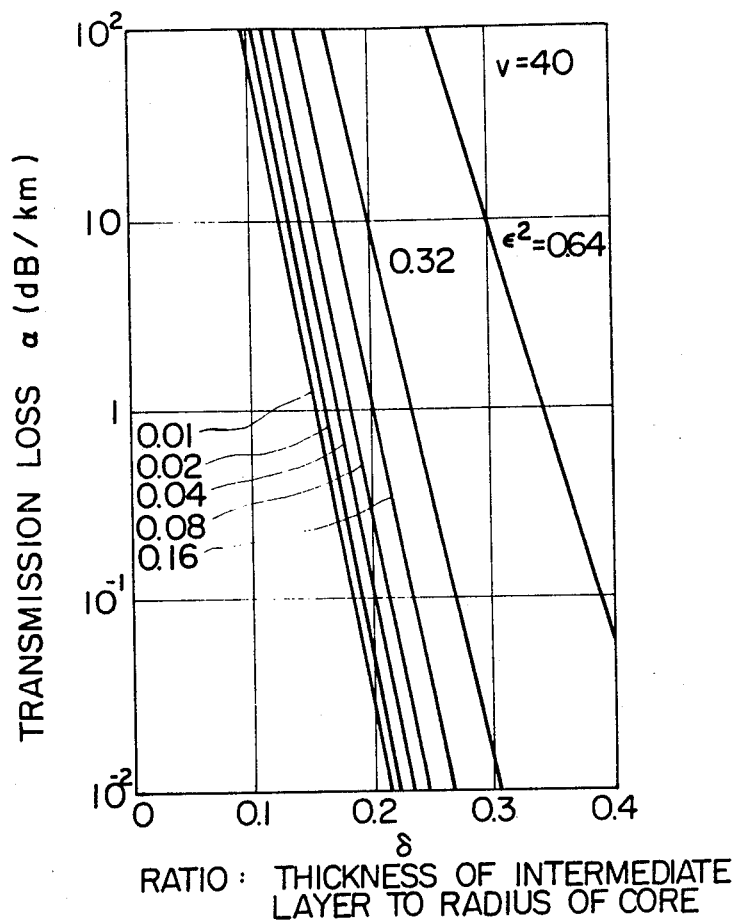

FIGS. 3A, 3B and 3C illustrate the relations of $\alpha_L$ to the intermediate layer thickness ratio δ. From the Figures, δ for making $\alpha_L$ a predetermined value is evaluated when the normalized frequency $\hat{v}$ and the index parameter $\epsilon^2$ are given.

In general, the loss of the leaky modes in the repeater spacing is desired to be in the range of 10 dB or more, in order that the influence of the leaky modes on the bandwidth can be neglected.

Figure 4A:
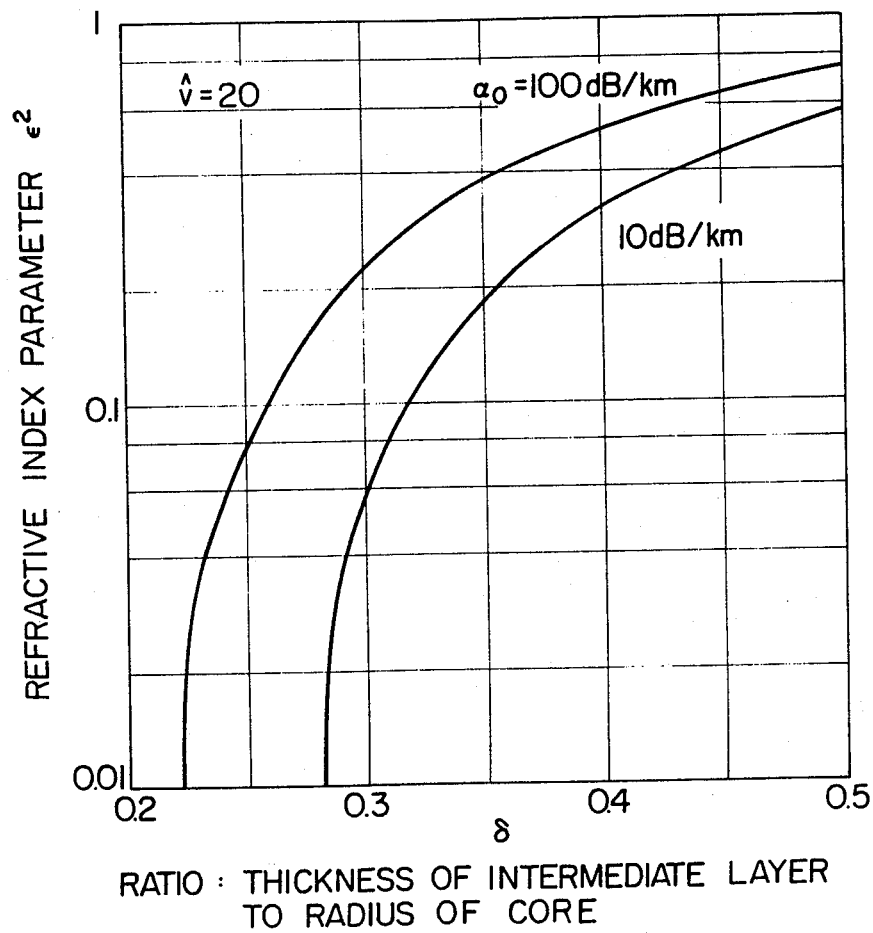
FIGS. 4A, 4B and 4C are characteristic diagrams showing the relations between a refractive index parameter $\epsilon^2$ for bestowing a certain fixed transmission loss $\alpha_L$ and the ratio $\delta$.
Figure 4C:
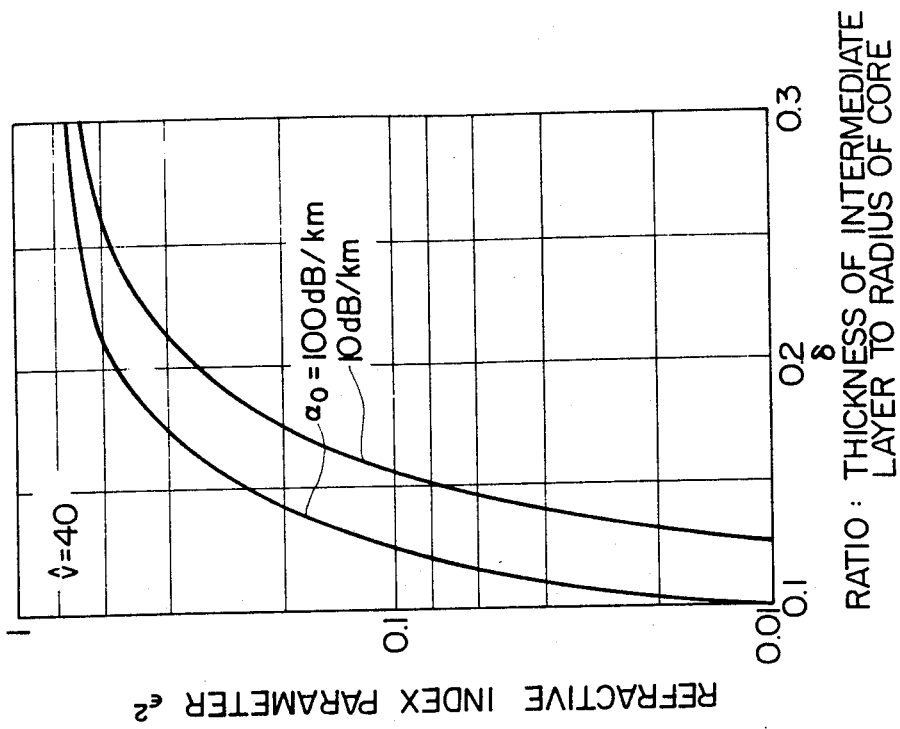
Figure 4B:
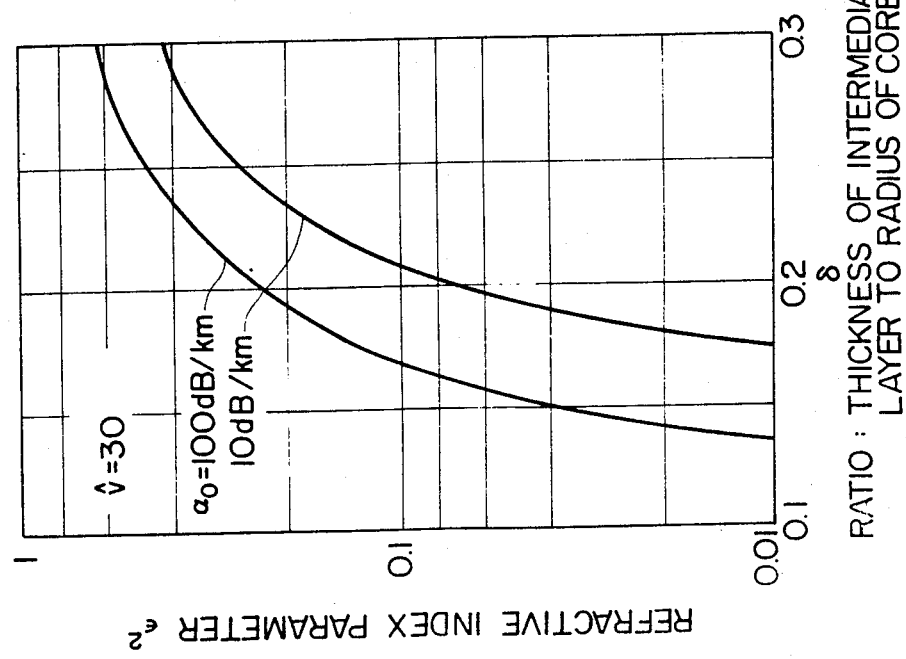

FIGS. 4A, 4B and 4C illustrate the relations of $\epsilon^2$ and δ at $\alpha_L = 10$ dB/km, with the parameter being $\hat{v}$. As is apparent from the Figures, in a practical range in which $\hat{v}$ is 20 to 40 and in which the refractive index parameter $\epsilon^2$ is below about 0.7, the intermediate layer thickness ratio δ must be within a range of 0.1 to 1.

As explained above, according to the invention, a sufficient loss is bestowed on the unnecessary leaky modes, and the optical fiber which has the wideband graded-core structure of stable characteristics and the intermediate layer of low refractive index can be obtained.

Now, the invention will be described in detail in connection with examples.

EXAMPLE 1

Figure 5:
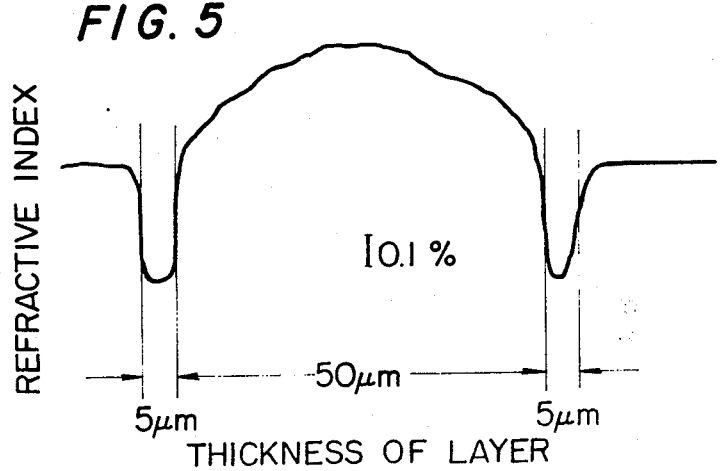
FIG. 5 shows the result of measurement of a radial refractive index distribution in an example of the optical fiber according to the invention.

A mixture gas consisting of silicon tetrachloride $SiCl_4$, oxygen $O_2$ and boron bromide $BBr_3$ was caused to flow through the interior of a natural quartz tube which had an inside diameter of 12 mm φ and an outside diameter of 14 mm φ and which was rotating at 50 r.p.m. A local heating device was relative to the quartz tube at a speed of 2.5 mm/sec. Thus, a uniform silicon dioxide ($SiO_2$) film containing boron trioxide $B_2O_3$ was deposited on a tube wall. Subsequently, the boron bromide gas was changed over to phosphorus oxychloride POCl$_3$, the concentration of which was increased in proportion to substantially the square root of the reaction time. Thus, a silicon dioxide (SiO$_2$) film which had a concentration gradient of phosphorus pentoxide P$_2$O$_5$ in the direction of the thickness of the film was deposited. Thereafter, the resultant tube was densely fused along its axis and was heated and drawn into an optical fiber. A refractive index distribution in a section of the fiber was measured. The result of measurement is shown in FIG. 5. Letting the refractive index distribution in the core be:

$$n(r) = n_o(1 - Ar^\alpha)$$

the quantities were $\alpha \approx 2.1$, $A \approx 3.5 \times 10^{-6}$ and $n_o \approx 1.46$. Here, r denotes the distance (in microns) from the center of the fiber. The diameter of the core of the fiber was 50 microns, the width of the intermediate layer was 3 microns, and the diameter of the whole fiber was 130 microns. The reason why the width of the intermediate layer was made 3 microns was to bestow sufficient attenuation on the leaky modes.

The transmission bandwidth of the above fiber for a gallium arsenide semiconductor laser having a wavelength of 0.835 micron was actually measured for eight specimens of the same specifications. It was 290 to 720 MHz·km, and was 470 MHz·km on the average. The transmission length was 0.33 to 1.22 km, and was 0.71 km on the average.

EXAMPLE 2

By the same method as in Example 1, an SiO$_2$ film containing about 2.25 mol % of B$_2$O$_3$ was deposited on the inner wall surface of the quartz tube, and an SiO$_2$ film containing P$_2$O$_5$ was subsequently deposited. The molarity of the P$_2$O$_5$ was varied continuously towards the center over from 0% to about 15%. The composite tube thus obtained was heated and densely fused along the axis. The resultant tube was a preform, which was heated and drawn. Thus, a fiber having the refractive index distribution as in FIG. 1 was obtained.

FIG. 5 shows a refractive index distribution in a section of a fiber in another example, the distribution having been measured by the reflection method. In this case, the core diameter was 50 μm, and the intermediate layer thickness was 5 μm. $\Delta = 3 \times 10^{-3}$ and $1 - b = 6 \times 10^{-3}$ for a wavelength of 0.63 μm. The exponent v of the refractive index distribution in the core was 1.8 to 2.4. Where the fiber length was 1.12 Om, the transmission bandwidth was measured with a gallium arsenide semiconductor laser. It was 700 MHz. Further, when the distance characteristic of the scattered light intensity of the fiber was measured by the integrating sphere method, a substantially perfect exponential attenuation characteristic was obtained. From the above results, it is apparent that the leaky modes were endowed with a sufficiently large loss.

As explained above, according to the invention, sufficiently large loss is bestowed on the unnecessary higher order modes which give rise to group delay distortions, whereby an optical fiber whose wide bandwidth is not adversely affected is obtained. This is greatly effective.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

We claim:
1. An optical fiber comprising:
a cylindrical core of dielectric material having an index of refraction which varies in the radial direction of the core;
an intermediate layer disposed on said core and being made of a dielectric material which has a uniform index of refraction;
a cladding layer disposed on said intermediate layer and being made of a dielectric material which has a uniform index of refraction higher than the index of refraction of said intermediate layer, and wherein the index of refraction of said core at the central portion thereof is higher than the indices of refraction of said cladding layer and said intermediate layer, and the index of refraction of the periphery of said core is substantially equal to the index of refraction of said cladding layer, wherein the thickness of said intermediate layer lies within a range of 0.1 to 1 times the radius of the core.

2. An optical fiber according to claim 1, wherein the dielectric material of said optical fiber includes silicon dioxide selectively doped with at least one compound selected from the group consisting of GeO$_2$, TiO$_2$, P$_2$O$_5$, B$_2$O$_3$, and Al$_2$O$_3$.

3. An optical fiber according to claim 2, wherein the dielectric material of said optical fiber includes silicon dioxide selectively doped with more than one compound selected from the group consisting of GeO$_2$, TiO$_2$, P$_2$O$_5$, B$_2$O$_3$, and Al$_2$O$_3$.

4. An optical fiber according to claim 1, wherein the thickness of said intermediate layer lies within a range of 0.1 to 0.5 times the radius of the core.

* * * * *